UNITED STATES PATENT OFFICE.

JOHN H. THORN, OF PUYALLUP, WASHINGTON.

COMPOSITION FOR PRESERVING FRUITS, &c.

SPECIFICATION forming part of Letters Patent No. 697,566, dated April 15, 1902.

Application filed March 30, 1901. Serial No. 53,709. (No specimens.)

*To all whom it may concern:*

Be it known that I, JOHN H. THORN, a citizen of the United States, residing at Puyallup, in the county of Pierce and State of Washington, have invented certain new and useful Improvements in a Composition of Matter for Preservation of Fruits and Vegetables; and I do hereby declare the following to be a full, clear, and exact description of the invention, such as will enable others skilled in the art to which it appertains to make and use the same.

My invention relates to a composition to be used as a preservative for fruits and vegetables.

The invention consists of the following ingredients, combined in about the proportions stated: lime, (slaked,) twenty pounds; ordinary land-plaster, five pounds; wheat-middlings, five pounds. These ingredients are thoroughly mixed together in a dry condition, and then the fruit or vegetables to be preserved are buried or placed in the same, so as to be completely covered thereby.

In the case of oranges or other fruit having a porous skin the same may be wrapped in suitable paper before being placed in the preserving composition.

The fruits or vegetables may be buried in ordinary boxes or barrels and should be kept in a place having an even temperature and of a degree best suited for fruit and vegetables.

I have thoroughly tested my improved preserving compound and have secured most satisfactory results. For instance, apples placed in this compound have been kept an exceedingly long period, and when taken out they have been found to be as fresh and perfect as when first placed in the same.

Having now described my invention, what I claim as new, and desire to secure by Letters Patent, is—

A composition of matter for preserving fruits and vegetables, composed of slaked lime, ordinary land-plaster, and wheat-middlings, thoroughly mixed together and in a dry condition, substantially in the proportions described.

In testimony whereof I hereunto affix my signature in presence of two witnesses.

JOHN H. THORN.

Witnesses:
FRANK J. MILLER,
J. E. MCFARLAND.